(12) United States Patent
Sacks et al.

(10) Patent No.: US 7,991,655 B1
(45) Date of Patent: Aug. 2, 2011

(54) METHOD FOR OBJECT LOADING AND OBJECT DELIVERY USING AN OBJECT LOCATION IDENTIFICATION TRIGGER

(75) Inventors: Jerry Dennis Sacks, Houston, TX (US); James Michael Parks, Houston, TX (US); Gregory Parker Braun, Houston, TX (US); Christopher Burks Parr, Houston, TX (US)

(73) Assignee: Systems Application Engineering, Inc., Houston, TX (US)

( * ) Notice: Subject to any disclaimer, the term of this patent is extended or adjusted under 35 U.S.C. 154(b) by 0 days.

(21) Appl. No.: 12/772,517

(22) Filed: May 3, 2010

(51) Int. Cl.
 *G06Q 10/00* (2006.01)
 *G06K 7/10* (2006.01)
 *G06K 9/22* (2006.01)
 *G06F 3/02* (2006.01)

(52) U.S. Cl. ............... 705/28; 235/462.45; 235/462.48; 235/472.01; 345/172

(58) Field of Classification Search .............. 705/28; 235/462.45, 462.48, 472.01; 345/172
 See application file for complete search history.

(56) References Cited

U.S. PATENT DOCUMENTS

| | | | | |
|---|---|---|---|---|
| 5,450,596 | A * | 9/1995 | Felsenstein | 708/141 |
| 5,496,992 | A * | 3/1996 | Madan et al. | 235/472.02 |
| 6,026,378 | A * | 2/2000 | Onozaki | 705/28 |
| 2002/0173299 | A1 * | 11/2002 | Buchholz et al. | 455/418 |
| 2003/0020629 | A1 * | 1/2003 | Swartz et al. | 340/825.25 |
| 2004/0128133 | A1 * | 7/2004 | Sacks et al. | 704/270 |
| 2004/0128134 | A1 * | 7/2004 | Sacks et al. | 704/270 |
| 2004/0133303 | A1 * | 7/2004 | Sacks et al. | 700/213 |
| 2004/0138781 | A1 * | 7/2004 | Sacks et al. | 700/245 |
| 2004/0181467 | A1 * | 9/2004 | Raiyani et al. | 705/28 |
| 2005/0284934 | A1 * | 12/2005 | Ernesti et al. | 235/385 |
| 2006/0208086 | A1 * | 9/2006 | Rudeen et al. | 235/472.01 |
| 2007/0040808 | A1 * | 2/2007 | Choo | 345/172 |
| 2007/0080930 | A1 * | 4/2007 | Logan et al. | 345/156 |
| 2007/0083443 | A1 * | 4/2007 | Sacks et al. | 705/28 |
| 2007/0088628 | A1 * | 4/2007 | Hopson et al. | 705/27 |
| 2008/0097724 | A1 * | 4/2008 | Morris et al. | 702/187 |
| 2010/0271187 | A1 * | 10/2010 | Uysal et al. | 340/10.4 |

OTHER PUBLICATIONS

"Staying on track with prescription drug distribution: the stakes are high in pharmaceutical distribution. Here's how the leaders are delivering meticulous quality control in order fulfillment. (Prescription Drug Distribution)", Modern Materials Handling, v57, n4, Apr. 2002.*

Ross et al., "A Framework for Developing Implementation Strategies for a Radio Frequency Identification (RFID) System in a Distribution Center Environment", Journal of Business Logistics, v30n1, 2009.*

Napolitano, Maida, "Voices in the warehouse: Should you listen?", Logistics Management, v46n7, Jul. 2007.*

* cited by examiner

*Primary Examiner* — John W Hayes
*Assistant Examiner* — Kevin Flynn
(74) *Attorney, Agent, or Firm* — Buskop Law Group, PC; Wendy Buskop

(57) ABSTRACT

A method for loading and delivering objects using at least one mobile processor in communication with a mobile data storage to provide at least one command to an operator is provided herein. The mobile processor can be in further communication with at least one input device. A host processor can provide the libraries and a list of objects to be loaded and delivered to the mobile processor. The host processor can be in communication with a host data storage that comprises computer instructions. An output device and an OLI trigger can also be used in conjunction with the mobile processor.

21 Claims, 13 Drawing Sheets

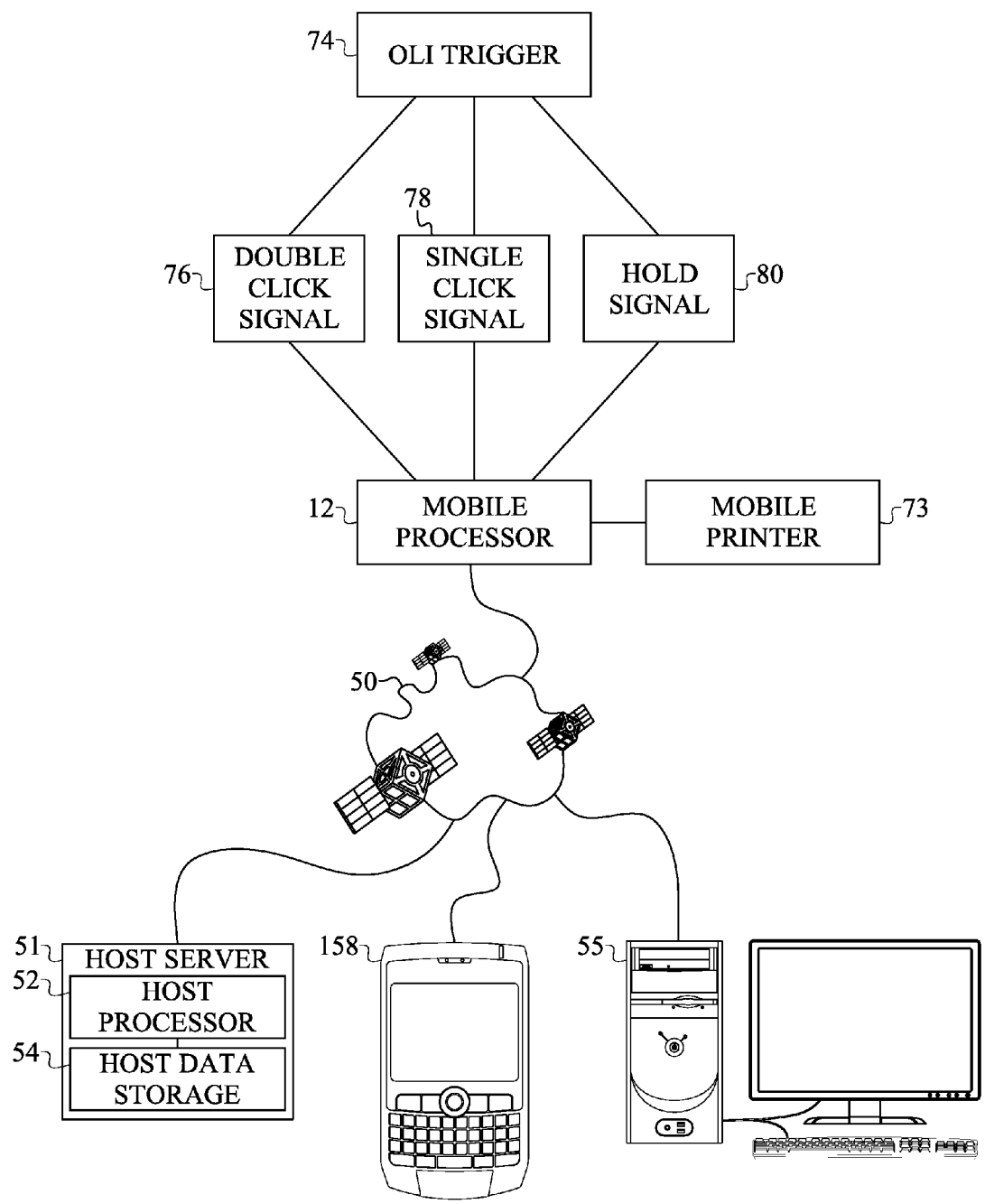

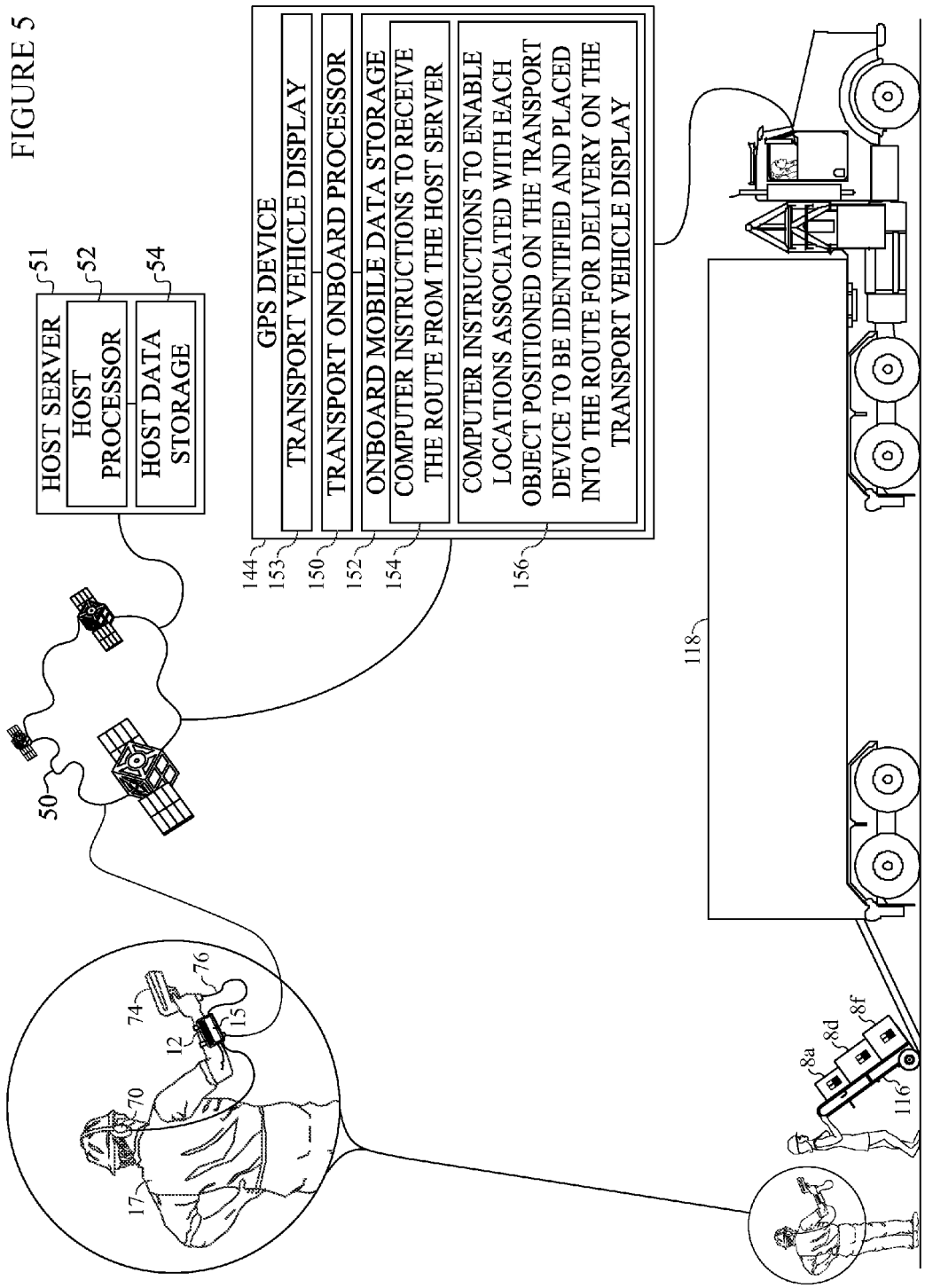

METHOD FOR OBJECT LOADING AND OBJECT DELIVERY USING AN OBJECT LOCATION IDENTIFICATION TRIGGER

FIELD

The present embodiments generally relate to a method of object loading and delivery, onto one or more transport devices, object delivery using one or more transport vehicles whereby at least one mobile computer having an Object Location Identification trigger is used, and wherein the mobile computer communicates to a host server with a host processor and a host data storage with multiple libraries via at least one network.

BACKGROUND

A need exists for a method for loading and delivering objects using at least one mobile processor in communication with a mobile data storage, at least one input device, a host processor, a host data storage, an output device, and a fast acknowledgement device.

A need exists for a method that uses a set of simple signals via a hand held acknowledgment device, which makes the hand held acknowledgment device much safer to use while driving as opposed to typing on a keyboard.

A need exists for a method that supports the capture of the data contained in a GS1 DataBar in order to improve the tracking, traceability, i.e. lot number and country of origin as well as product sell-by and expiration dates during the object delivery processes to assist logistics companies with data collection for complying with the Foodservice GS1 US Standards Initiative that is focused on reducing wastes in the supply chain, improvement of information for customers and establishing a foundation for improving food safety.

A need exists for a method that can quickly receive, verify, and store various codes on an object, a location, and delivery information for use by an operator, while the operator simultaneously provides the simple signals from a battery-operated hand held or wearable device.

A need exists for a method with a portable component that communicates with a host server that can store a set of libraries containing information on delivering objects to a location, specific operator information necessary for loading and delivery, specific transport devices such as cart numbers, or skids numbers, and transport vehicles and delivery vehicles.

A need exists for a method where a host server can transmit a list of objects to be delivered, a list of delivery vehicles, and a list of delivery locations to different mobile processors for an operator to continuously load using an Object Location Identification (also referred to as OLI) trigger and deliver objects safely, while maintaining efficiency and speed.

The present embodiments meet these needs.

BRIEF DESCRIPTION OF THE DRAWINGS

The detailed description will be better understood in conjunction with the accompanying drawings as follows:

FIG. 4 shows an embodiment of an Object Location Identification Trigger sending signals.
FIG. 5 shows an embodiment of loading and delivery components usable with the method.

Figure 1:
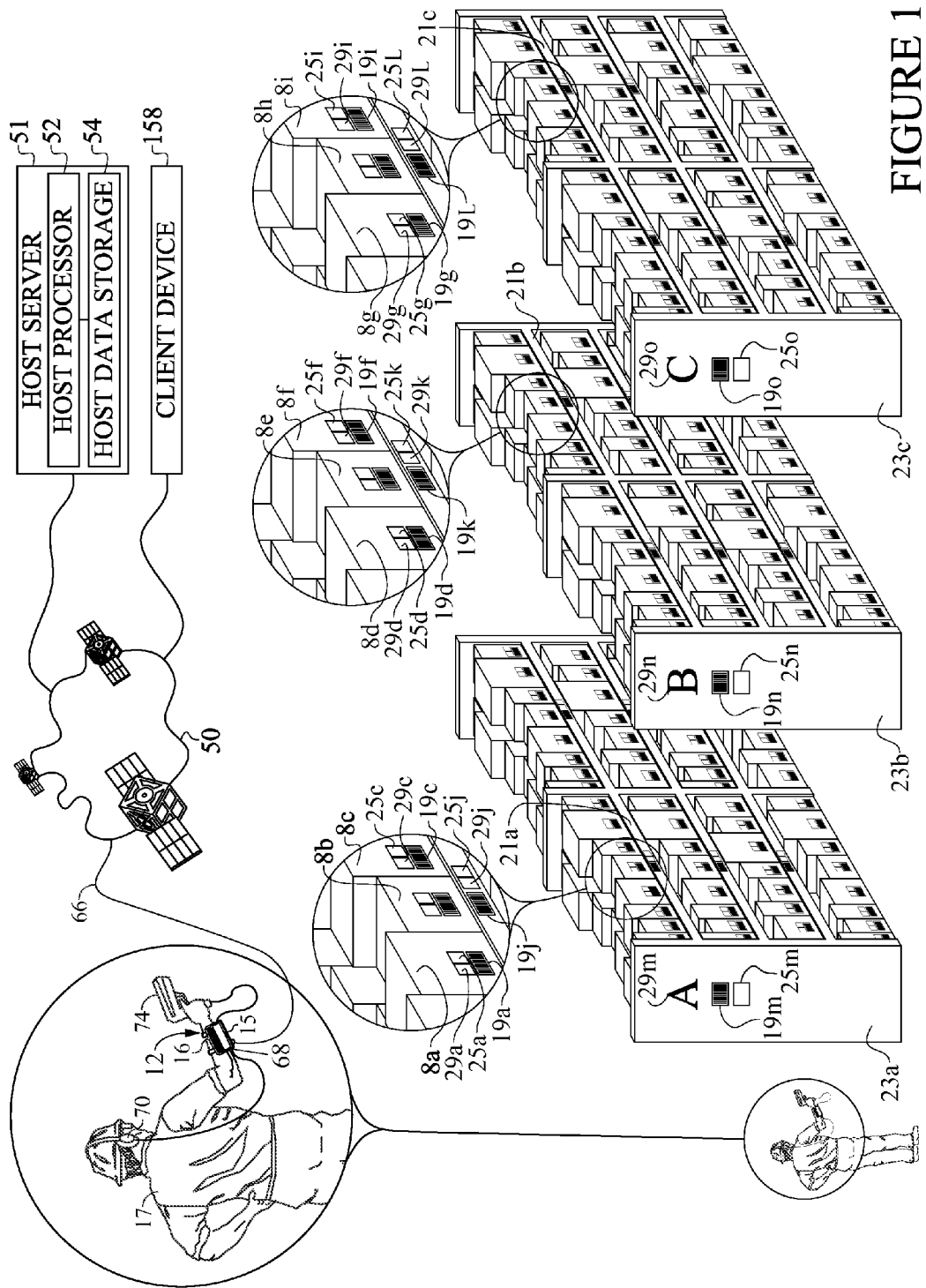
FIG. 1 shows an embodiment of a system usable with the method.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method for loading objects onto one or more transport devices and delivering objects to one or more locations by using one or more transport vehicles or delivery vehicles which uses a mobile computer, and an Object Location Identification trigger that communicates via a network to a host server. The host server can communicate with an external computer using a first network. The host server can communicate via a second network or the first network to at least one mobile processor that is used to scan one or more transport vehicles and transport devices or delivery vehicles, while simultaneously communicating with an onboard mobile computer for tracking deliveries.

The novelty of the method is used for loading and delivering objects, such as canned food, beach chairs, or valves, by using at least one mobile processor with at least one mobile data storage that communicates via a network to a host server with host processor and data storage.

The method can be used for loading or delivering objects onto at least one transport vehicle. The method can include using at least one mobile processor for use by an operator, at least one onboard mobile processor for use by a driver, at least one input device, a mobile data storage, a host processor, and an output device.

In an embodiment, the onboard mobile processor and the mobile processor can be one unit.

The at least one input device can be an Object Location Identification trigger, herein also referred to as the OLI trigger, in communication with the mobile processor. The OLI trigger can provide a "hold" signal to the mobile processor that informs the mobile processor that the operator will perform a function.

The operator can use the OLI trigger to scan or read a member of the group consisting of: a bar code, an RFID tag, an alpha code, a numeric code, an alphanumeric code, and combinations thereof on at least one object.

The operator can use the OLI trigger to can scan or read a member of the group consisting of: a bar code, an RFID tag, an alpha code, a numeric code, an alphanumeric code, and combinations thereof of a first location proximate to the at least one object.

The operator can use the OLI trigger to scan or read a member of the group consisting of: a bar code, an RFID tag, an alpha code, a numeric code, an alphanumeric code, and combinations thereof of a second location proximate to the first location.

The operator can use the OLI trigger to can scan or read a member of the group consisting of: a bar code, an RFID tag, an alpha code, a numeric code, an alphanumeric code, and combinations thereof of a transport device.

The operator can use the OLI trigger to can scan or read a member of the group consisting of: a bar code, an RFID tag, an alpha code, a numeric code, an alphanumeric code, and combinations thereof of a transport vehicle.

The method can include scanning or reading a member of the group consisting of: a bar code, an RFID tag, an alpha code, a numeric code, an alphanumeric code, and combinations thereof on a delivery location, or combinations thereof.

The OLI trigger can also provide a double-click signal to the mobile processor to inform the mobile processor that the operator has completed the at least one command, that the operator has arrived at the first location, that the operator has arrived at the second location, that the operator has arrived at the transport device, that the operator has arrived at the transport vehicle, that the operator is ready to accept a new command, that the operator is ready to proceed to a next step, or combinations thereof.

The OLI trigger can also provide a single-click signal to the mobile processor that informs the mobile processor to repeat the most recent command, question, information or statement.

In an embodiment, an additional input device can be used along with the OLI trigger. The additional input device can be a keyboard, a touch screen, or combinations thereof.

In one or more embodiments, the input device can be or include a 3-dimensional spatial coordinate sensor.

The 3-dimensional spatial coordinate sensor can allow the operator to use a physical motion to communicate to the mobile processor at least one of the following: a dimension of the at least one object, a 3-dimensional spatial coordinate of the at least one object, a yes command, a no command, a repeat command, a completed task command, a "can not find transport vehicle, transport device, or combinations thereof" command, an alpha code, a numeric code, or combinations thereof.

The mobile data storage can provide at least one command to an operator. The mobile data storage can have computer instructions to receive, verify, and store a member of the group consisting of: a bar code, a RFID tag, an alpha code, a numeric code, an alphanumeric code, and combinations thereof on at least one object.

The mobile data storage can have computer instructions to receive, verify, and store a member of the group consisting of: a bar code, a RFID tag, an alpha code, a numeric code, an alphanumeric code, and combinations thereof of a first location proximate to the at least one object.

The mobile data storage can have computer instructions to receive, verify, and store a member of the group consisting of: a bar code, a RFID tag, an alpha code, a numeric code, an alphanumeric code, and combinations thereof of a second location proximate to the first location.

The mobile data storage can have computer instructions to receive, verify, and store a member of the group consisting of: a bar code, an RFID tag, an alpha code, a numeric code, or combinations thereof on at least one transport device using the input device to verify the transport device as a transport device that should or should not be loaded on one of the transport vehicles.

In an embodiment, the transport device can be a cooler, a pallet, a tote, a box, a sack, a bag, a wheeled trolley, a container, or combinations thereof.

The mobile data storage can have computer instructions to receive, verify, and store a member of the group consisting of: a bar code, a RFID tag, an alpha code, a numeric code, or combinations thereof using the input device to verify that the transport vehicle is a correct transport vehicle for the objects to be loaded.

The mobile data storage can have computer instructions to receive, verify, and store a member of the group consisting of: a bar code, a RFID tag, an alpha code, a numeric code, or combinations thereof to identify a location plurality of locations for a plurality of objects or transport devices should be loaded on the transport vehicle.

The mobile data storage can have computer instructions to receive, verify, and store a member of the group consisting of: a bar code, a RFID tag, an alpha code, a numeric code, or combinations thereof for a delivery location using the input device to verify the transport vehicle is at the delivery location and that the object has been delivered.

The mobile data storage can have computer instructions to provide a command to an operator identifying the at least one object, the first location of the at least one object, the second location relative to the first location, the transport device, the transport vehicle, the delivery location, or combinations thereof.

The mobile data storage can have computer instructions to provide a command to the operator to move to the at least one object, the first location, the second location, the transport device, the transport vehicle, the delivery location, or combinations thereof.

In an embodiment, the delivery location can be a pick-up location, an address, or combinations thereof.

The mobile data storage can have text-to-speech computer instructions enabling the mobile processor to translate a text command to an audio command for the operator.

The mobile data storage can have computer instructions for receiving a query from the operator.

The mobile data storage can have computer instructions for providing a result to an output device.

The mobile data storage can be in communication with a host processor through a network, wherein the host processor is in communication with the mobile processor.

The mobile data storage can have computer instructions to request the host processor to verify that the mobile data storage has a current version of at least one library.

The at least one library can be selected from the group of libraries comprising: a library of objects to be loaded, wherein the library of objects comprises a location for each object; a library of transport devices associated with each object to be loaded; a library of transport vehicles; a library of delivery locations; a library operator information; or combinations thereof.

The library of transport devices can have a location for each transport device.

The library of transport vehicles can have a location for each transport vehicle.

The library of delivery locations can have an address, a longitude and a latitude, or another geographical indicator.

The mobile data storage can have computer instructions for receiving updated versions of the libraries from the host data storage.

The method can also use the host processor to provide the mobile processor with the at least one library and a list of objects to be loaded, a list of transport devices to be loaded, a list of transport vehicles to be loaded, and a list of delivery locations.

The host processor can be in communication with a host data storage. The host data storage can have or include the library of objects to be loaded, the library of transport devices associated with each object to be loaded, the library of transport vehicles, the library of delivery locations, the library of operator information, or combinations thereof.

The host data storage can have or include computer instructions to receive a request from the mobile processor to obtain the list of objects to be loaded.

The host data storage can have or include computer instructions to compile the list of objects to be loaded with associated transport devices and associated transport vehicles based on the request using the libraries in the host data storage.

The host data storage can have or include computer instructions to transmit the list of objects to be loaded with associated transport devices and associated transport vehicles from the host data storage to the mobile data storage.

The method can use the output device. The output device can have or include an audio output device and a display.

The audio output device can be in communication with the mobile processor to provide the at least one command through the audio output device for the operator, driver, or combinations thereof to hear.

The display can present the list of objects to be loaded with associated transport devices and associated transport vehicles to the operator, to present the at least one command to the operator, driver, or combinations.

The user can be given commands for loading, which include: Alternatively, the commands can be expressed as numbers For example, the screen may display a load summary.

The load summary can include a route number, a bay or door through which loading occurs, a trailer number for the load, the number of stops the trailer has to make and the stage area location.

The load summary can include a number of pallets, cases, and cubes and different letters "F" "C" and "D" can be displayed showing on the display which portions of the load are in the freezer section, cooler section, and dry compartments of the trailer.

For loading, the user can have a screen that reveals the route by pallet number and by zone of the pallet.

Using the trigger, the loader can indicate which pallet was loaded and in which zone.

The software can indicate to wearer of the mobile computer that the pallet scanned is out of sequence. The software can indicate to the wearer of the mobile computer that missing cases have occurred, by number of cases, by stop and by specific item number.

The software has computer instructions to indicate that a pallet should be loaded in a different zone after the zone has been clicked on by the OLI trigger, and provide a message to the operator that the palled should be loaded in a different zone 212 of a trailer 112233.

The user may select information about the load using a drop down menu providing information on case temperature, missing cases, whether the compartment is close and pallet contents.

Uniquely, this system can tell a wearer every content, every specification about the products loaded, not just information about the pallets. The system allows the user to not only know quantity by the details of refrigeration temperatures needed for loaded goods, and how long a product is expected to be on the trailer till delivery.

The steps of the method can be repeated until all objects on the list of objects to be loaded are in fact loaded in the proper quadrant on the proper pallet or transport device and into the proper transport vehicle.

The steps of the method can be repeated once loading is complete to assist in delivering all objects on the list of objects to be delivered.

The method can include computer instructions within the host data storage to transmit to the mobile processor at least one route for delivery of the list of objects, with associated transport devices, associated transport vehicles, and delivery locations.

In an embodiment, the at least one route for delivery can be procured by using GPS or other mapping software. The computer instructions for the GPS or other mapping software can be stored in the host data storage.

The at least one route can be associated with one of the objects being carried on one of the transport vehicles. The at least one route can be downloaded to the mobile data storage using computer instructions into the mobile data storage.

In an embodiment, the method can include computer instructions to receive, verify, and store a member of the group consisting of: a bar code, an RFID tag, an alpha code, a numeric code, or combinations thereof on at least one location proximate to a transport vehicle using the input device to verify the at least one location proximate to the transport vehicle is correct for loading.

In an embodiment, the method can include computer instructions for inserting the at least one location proximate to a transport vehicle on the list of objects to be loaded with associated transport devices and associated transport vehicles based on the request using the libraries in the host data storage.

In an embodiment, the method can include transferring the at least one command, the list of objects to be loaded with associated transport devices and associated transport vehicles, the at least one library, or combinations thereof between the mobile processor, the host processor, and at least one external computer system.

In an embodiment, the at least one external computer system can function the same as the mobile processor.

In an embodiment, the method can include entering an operator code for logging onto the mobile processor. The operator code can be transmitted to the host processor via computer instructions within the mobile data storage to transmit the operator code to the host processor. The host data storage can have computer instructions to acknowledge receipt of the operator code and to verify that the operator associated with the operator code is allowed access to the mobile processor, the mobile data storage, the libraries, or combinations thereof.

In an embodiment, the method can include using a button on a wearable scanner, an optical reader, a RFID reader, a trigger on a scanner, an optical reader, an actuator on a scanner, a reader, an input device, or combinations thereof as the object or location identification trigger.

In one or more embodiments, the method can include using computer instructions in the mobile data storage for instructing the mobile processor to prepare a summary of objects to be loaded, a summary of transport devices to be loaded, a summary of transport vehicles to be loaded, an indication of a quantity of objects for each location, or combinations thereof.

In an embodiment, the method can include using computer instructions in the mobile data storage to obtain status information on the loading of objects. The status information can be an indication of the operator's performance compared to an expected completion time for loading the list of objects.

In an embodiment, the method can include using computer instructions to identify an object, a transport device, a transport vehicle, or combinations thereof not loaded from the list of objects with associated transport devices and associated transport vehicles to be loaded.

In an embodiment, the method can include using computer instructions in the mobile data storage to request that the operator answer a series of safety questions regarding one of the transport vehicles that includes at least one question selected from the group comprising:
- are the brakes of the transport vehicle working?;
- is the horn of the transport vehicle working?;
- is the steering of the transport vehicle working?;
- is there any damage to the transport vehicle?;
- is there a leak within the transport vehicle?;
- are the tires on the transport vehicle inflated and undamaged?;
- are forks on the transport vehicle undamaged?; or combinations thereof.

In an embodiment, the method can include using computer instructions in the mobile data storage for instructing the mobile processor to alert the operator to position each object at a specific location on one of the transport devices, one of the transport vehicles, or combinations thereof.

In an embodiment, the driver can use the OLI trigger to verify when each object or groups of objects is delivered to each delivery location.

The OLI trigger can be a finger mounted clicker with a scanner that is wired to the mobile computer.

The OLI trigger can be used with each mobile processor, namely, the onboard processor of the transport vehicle and the mobile computer of an operator for loading objects. Either OLI trigger can be adapted to provide a plurality of signals, such as three simple signals to the mobile computer. The three simple signals can be a single click, a double click, and a hold signal.

The simplicity of this process, the low cost of the operation, provides a technique to increase the quantity of object or items that can be loaded or delivered increases from 5% to 25% for customers that load and delivery up to 6,000,000 objects or items per day.

The mobile processor can be used to receive, verify, and store codes for loading the objects on a particular numbered pallet and for delivering objects by delivery location.

The external computer via a network can download the route to the host server.

Once the objects are loaded on the correct transport devices, all object and transport information, including what the specific catch weights are for certain items are communicated to an onboard mobile computer on a delivery vehicle. The host computer transfers the route map to the onboard computer data storage for displaying addresses for delivery to the driver.

In an embodiment, a host server with a host processor and a host data storage can store and continuously update various libraries in its data storage. The data storage can contain identification of transport devices for loading and delivery to various locations. The updated information can include information on transport vehicles, updated street addresses, and names of customer locations for delivery of the objects (with or without an additional transport device).

The host server can have a data storage to maintain a library of information on all operators, such as operator names, operator log ins and operator passwords.

The host server can have computer instructions in its data storage to verify that an operator has been transmitted the correct information about objects to be loaded or delivered.

The host server can have computer instructions in the host data storage that compiles and transmits a list of objects, a list of delivery devices, a list of delivery vehicles, and a list of delivery locations to a mobile processor, while the operator pulls the OLI trigger to continue to load and deliver.

The first mobile processor can be wearable by an operator, which the operator loads objects and moves loaded transport devices onto transport vehicles or near transport vehicle. The first mobile processor can be in communication with the host server through at least one network, such as a wireless network, a cellular network, a Bluetooth communications network, or another network.

The first mobile processor with an OLI trigger may communicate on a separate network with the host server and an onboard computer. The onboard computer can have an onboard mobile processor with an onboard data storage.

The first mobile processor can be in communication with its own mobile data storage, a display, and a first output that can connect to a first output device, such as headphones to be worn by an operator. The first mobile processor can be in communication with a second output that can connect to the display.

The first mobile processor can have at least two inputs for receiving information from the OLI trigger and from another source, such as a keyboard or touch screen. The inputs can be used simultaneously for fast operation.

In one or more embodiments, the input device can be a touch screen, a joy stick, or a Braille command input device, or combinations thereof.

The input device can allow the operator to make multiple requests for information, such as:
Lists of objects to be loaded on a specific transport device, such as "all the #2 box filters go on the cart numbered 1234";
Lists of objects to be loaded on specific transport vehicles, such as "all objects on the transport device Cart 1235 go on the brown truck 34 in bay 12."

In an embodiment, one of the input devices can be used with an embodiment of the method to communicate acknowledgement of a list through a physical motion of the operator with the input device, such as the sweep of the arm.

The physical motion of the input device can also be used to initiate a communication from the input device to the mobile processor.

The mobile data storage can have computer instructions to receive, verify, and store various codes on objects. For example, canned corn can have a code on it for a 12 pack and a different code on it for a 24 pack.

The mobile data storage can have computer instructions to receive, verify, and store various codes to identify a first location proximate to one or more of the objects. The first location can be a location, such as Shelf 2 of Aisle 10 in the Green warehouse.

The mobile data storage can have computer instructions to receive, verify, and store codes related to a second location that can be proximate to the first location, such as an aisle location proximate to a shelf location. The second location can be the end of Aisle 10, wherein the 12 pack of canned corn is located on shelf 2. In this example, aisle 10 is the first location, and shelf 2 is the second location.

The mobile data storage can include computer instructions to receive, verify, and store codes on a transport vehicle, such as Truck 24.

An operator can drive the transport vehicle, while an onboard mobile processor with transport vehicle display, two different transport vehicle input devices, and at least two transport vehicle outputs with at least one transport vehicle output device can be used.

The onboard mobile processor can communicate with an onboard mobile data storage to receive a list of objects to be delivered from the host server.

The onboard mobile processor can use an OLI trigger, while on the transport vehicle, to acknowledge the continuous feed of information. In this way, the operator can be continuously redirected and rerouted when necessary or due to changed conditions.

A driver may have to change a delivery schedule while driving based on a new customer need, such as a delivery for a wedding with a delivery time scheduled for 4 pm that must now occur at 12 noon.

Changes in a route may be needed, due to changed road conditions or for efficiency, so the driver needs to be rerouted from one interstate to another interstate. The transport vehicle mobile computer data storage and onboard processor can communicate with the host server, and with a built in or on-board global positioning device (GPS) to enable the host server to track the exact location of each truck and re-route. This allows a driver to acknowledge a change with a trigger, rather than having to stop the truck and type in a change.

This invention allows an operator to provide acknowledgement to changes while driving without sending a text message.

For example, a first command could be text viewable on the display that reads:
Load pallet 1625 on to trailer 686
Another example of the first command can read:
Locate cooler 256
Another command would be:
Load 3 canned corn 24 packs on cart 3
Load 2 canned corn 24 packs on cart 1
Load 7 canned corn 24 packs on pallet AB;
Another command could be:
Take all objects on transport device to loading bay 6
Another command could be
Load transport device 3 and transport device 6 on truck 3 in loading bay 6.
Another command could be
Load transport device 3 on truck 3 in loading bay 6
Leaving transport device 1 at loading bay 2.

The above are just a few examples of the commands that can be used with the method.

Alternatively, the commands can be expressed as numbers
For example, the screen may display pallet details:
Cases stop item number
1 03 2356
Beef brisket 32 oz
20 05 060598588
Grits, Frozen—Green Giant
3 02 0322108
Hamburger—Lean Sibs Additional information besides the stops, cases, and item number can be expressed on the screen, such as the type of goods, "beef brisket"

The loading method can provide information on the contents of a compartment, such as all items in the freezer, and all items loaded in the cooler and all items loaded in the dry compartment.

The loading software can instruct the user to begin a break period and select the type of break—such as lunch and with the trigger the start of the break can be tracked as well as the end of the break period. This step enables the efficiencies of the drivers to be tracked.

The Loading screen can also be used to show the user is out of coverage area, the device is powering up or restoring a connection, that the batter is low or that the scanner portion connected to the trigger is missing.

The mobile data storage can include computer instructions to provide a second command to the operation, which can be a loader, indicating that the loader should now move to the second location from the first location. This command can be repeated as needed.

An example of this command would be:
Command 1—Load pallet 56 into trailer at bay 15
Command 2—Place pallet 56 at trailer position R4
Command 3—Load pallet 35 into trailer at bay 16
Command 4—Place pallet 35 at trailer position L2
Command 5—Trailer at bay 16 loading complete The command can be presented visually on the display, such as words, a flashing indicator, or anther visual command.

The commands can be presented as an audio command, such as a verbal text message transmitted through an audio output, or as a sequence of beeps (such as 3 beeps means aisle 3), or another audio command. For example, beeps can acknowledge that the scanning occurred properly (1 beep) or improperly (3 beeps).

The mobile data storage can include text-to-speech computer instructions to enable the mobile processor to translate a text command to audio commands for the operator. This feature enables the commands to be presented simultaneously as both text and audio, to reduce mistakes, and quicken the loading and delivery of the objects. This reduces expensive delays in the loading and delivery process.

For example, a command provided by the mobile data storage on the display instructing the loader to "Load pallet 56 into trailer at bay 15" can be translated by the mobile processor into an audio command in Spanish and simultaneously provided to the audio output of the operator. This increases the versatility of the invention.

The mobile data storage can include computer instructions for receiving queries from the operator. For example, the operator can ask the mobile processors to repeat the last audio command by using the input device or the OLI trigger. This is very fast.

The computer instructions in the mobile data storage can enable the mobile processors to receive queries from the operator, to respond to the query, and to pass the query onto the host computer via the network if more information is needed.

Both of the mobile data storages can include computer instructions to request the host server to verify that the mobile data storage has a current version of at least one library needed to do the loading and/or the delivery of the objects.

The mobile data storage and the transport vehicle mobile data storage can include computer instructions for receiving updated versions of the libraries from the host server, such as by downloading the updated versions of the libraries. The method can ensure that the libraries in the mobile data storage are up-to-date at all times.

The libraries can be loaded in the mobile data storages from the host server. The libraries can include a library of each first location associated with each object; a library of each second location associated with each first location; a library of authorized operators of the mobile computers, a library of operator information on the operators; a library of objects to be loaded; a library of transport devices; a library of transport vehicles; a library with mapping software; a library of customers for delivery; or combinations thereof.

Each library can include a listing of all associated elements within that library and information related to the associated elements. For example, in the library of transport devices, the library can include a listing of all transport devices, carts, mini-trucks, skids, pallets and so on.

The library of transport devices can also include information related to each transport devices, such as each bar code, each RFID tag, each alpha code, or each numeric code disposed on each transport device.

The library may also include information on how much weight the transport device can carry, when the device was last serviced or last inspected for safety, and who used the transport device last.

Other specific information on the transport device can be included in the library, such as volume capacity of the transport device, how long the battery lasts, how many wheels the transport device has, and other detailed specification information.

The host data storage can include computer instructions to receive requests from the mobile processor for a list of objects to be loaded, for a list of transport devices to be loaded, a list of transport vehicles to be loaded and a list of delivery locations.

The host data storage can include computer instructions to compile the various lists using the libraries in the host data storage and using a customized "task list" for loading and delivery based on customer orders.

The OLI trigger can connect to an input on the mobile processor and another input device, like a back up keyboard that can be used to connect to a second input on the mobile processor.

A second output can connect the display with the mobile processor for viewing by the operator with the mobile computer.

The audio output device and the display can provide commands to the operator, such as "go to 123 Main Street, Houston, Tex.".

The display, the audio output device, or both can present one or more of the aforementioned lists to the operator as well as the commands.

The OLI trigger can be integral with the mobile processor formed in the housing, or it can be a separate device that connects to the mobile processor, either wirelessly or with a cable.

The OLI trigger has a trigger type button that the operator can click, double-click, or hold to create a signal that transfers to the mobile processor, which can then be uploaded to the host server.

In another embodiment the OLI trigger looks like a gun, and has a trigger mechanism like a gun that can have a scanner, an optical reader, an RFID reader, or a bar code reader on the gun barrel portion.

Examples of OLI triggers are the scanner triggers or buttons on the ring scanner and back-of-the-hand scanners, such as those made by Motorola of Chicago, Ill., United States, model number RS409 and RS309.

No English or standardized language is needed for high efficiency loading and delivery.

The assembly can eliminate recognition errors often associated with spoken input or spoken responses that might occur without such a trigger device.

A "double click" signal can be used to indicate an operator is ready for the next command. For example, the operator can actuate or click the OLI trigger twice to initiate the transmission of a signal to the mobile processor, thereby providing the communication that the operator is ready for the next step.

The operator can use the double click to answer "yes" to a question presented by the mobile processor, such as "are the brakes working correctly?". The operator can double click to indicate a "yes" answer.

The operator can use the OLI trigger to send a request to the mobile processor to repeat the most recent command, question, information or statement by providing a "single click" signal.

One or more embodiments can include communicating from the host server, the mobile processor, the onboard mobile processor, or combinations thereof, to an external computer system or to a client device. The external computer system or client device can be a client laptop that uses the network.

The external computer can have a data storage to take orders from customers, store orders, track inventory and create bills for customers. The external computer is can be connected via the Internet to the host server.

Another embodiment can include using an input device to recognize a physical movement, such as waiving an arm as a yes answer or a no answer. The input device can recognize a request to repeat a command, an indication that a task commanded is now complete, or an indication that the operator: "cannot find the object", "cannot find the first location", "cannot find the second location", "cannot find the transport device", "cannot find the transport vehicle", "cannot find the location near the transport vehicle", cannot find the delivery location", or combinations thereof.

In one or more embodiments, the mobile data storage can include computer instructions to transmit an operator code such as a log in number entered by the operator into the mobile processor to the host processor.

An embodiment of the method can verify each operator to prevent unwanted access to by individuals who are not trained on how to use the invention.

The host data storage can include computer instructions to acknowledge the operator code and to verify that the operator associated with the operator code can have access to the mobile processor and the libraries.

The mobile data storage can include computer instructions to obtain, store, and display status information on a successful completion of the tasks relative to the objects on the lists.

These computer instructions can be used to continuously and instantaneously provide an indication of the operator's performance compared to an expected completion time. The expected completion time can be an expected completion time for completing another one of the many tasks on one or more of the lists.

The alert can be an audio or visual alert that can be communicated to the operator by using the display and/or the audio output. The alert can be provided by using the text-to-speech computer instructions, wherein the audio is in one language and the text is in a different language.

The term "catch weight item" is defined herein to mean the total number of pounds on cases that change weight, such as 5 turkeys weighing 50.1 pounds can be a "catch weight" for the turkeys.

The mobile data storage can include computer instructions for recording the number and weight of catch weight items. The operator can use the input device to record the number and weight of catch weight items.

The "high quantity item" alert can be an audio or visual alert that can be provided using the audio output or the display, and can be provided when a large quantity of a particular item is required to be loaded or delivered.

The mobile data storage can include computer instructions for instructing the mobile processor to alert the operator to position each object at a specific location on an identified transport device or transport vehicle. The alert can be provided to the operator using the display or the audio output. For example, the specific location on the transport device can be at a bottom of a left quadrant of a pallet. For example, the specific location on the transport vehicle can be at a rear left portion of trailer of truck 12 in Bay 11.

Turning now to the host data storage, the host data storage can include computer instructions to indicate to the mobile processor at least one location for delivery of objects. The at least one location for delivery can be a loading location, a staging location, an interim location, a back of a truck, a trailer, or a vessel.

The host data storage can include computer instructions to create a route associated with each object disposed on a transport vehicle. The route can be created using GPS or other mapping software that can be stored in the host data storage. The host server can transmit the route to the mobile processor, the transport onboard processor, the mobile data storage, or the onboard mobile data storage through the network.

The onboard mobile data storage can include computer instructions to receive the route from the host server.

One or more embodiments can include a client device, such as a laptop, a portable digital assistant (PDA), a smart phone, a cellular phone, or another device. The client device can be in communication with the mobile processor, the host processor, the transport onboard processor, or combinations thereof through the network.

Turning now to the figures, FIG. 1 shows a system for selecting objects 8a-8i that is usable with that method.

A bar code 19a can be associated with the object 8a, a bar code 19c can be associated with the object 8c, a bar code 19d can be associated with the object 8d, a bar code 19f can be associated with the object 8f, a bar code 19g can be associated with the object 8g, and a bar code 19i can be associated with the object 8i.

An RFID tag 25a and an alpha/numeric code 29a can be associated with the object 8a, an RFID tag 25c and an alpha/numeric code 29c can be associated with the object 8c, an RFID tag 25d and an alpha/numeric code 29d can be associated with the object 8d, an RFID tag 25f and an alpha/numeric code 29f can be associated with the object 8f, an RFID tag 25g and an alpha/numeric code 29g can be associated with the object 8g, and an RFID tag 25i and an alpha/numeric code 29i can be associated with the object 8i.

A bar code 19j, an RFID tag 25j and an alpha/numeric code 29j can be associated with a first location 21a, here shown as a shelf. A bar code 19k, an RFID tag 25k and an alpha/numeric code 29k can be associated with a first location 21b. A bar code 19L, an RFID tag 25L and an alpha/numeric code 29L can be associated with a first location 21c.

A bar code 19m, an RFID tag 25m, and an alpha/numeric code 29m can be associated with a second location 23a, here shown as an aisle. A bar code 19n, an RFID tag 25n, and an alpha/numeric code 29n can be associated with the a second location 23b. A bar code 19o, an RFID tag 25o, and an alpha/numeric code 29o can be associated with the a second location 23c.

A host server 51 can have a host processor 52 and a host data storage 54. The host server 51 can be in communication with a network 50.

An operator 17 can have a mobile processor 12 which can be in communication with a display 15, an input 16, and an audio output device 70 which can be in communication with an output 68.

The operator 17 can have an OLI trigger 74 which can be in communication with the mobile processor 12.

A client device 158 can be in communication with the network 50. Status information 66 can be communicated over the network 50.

Figure 2A:
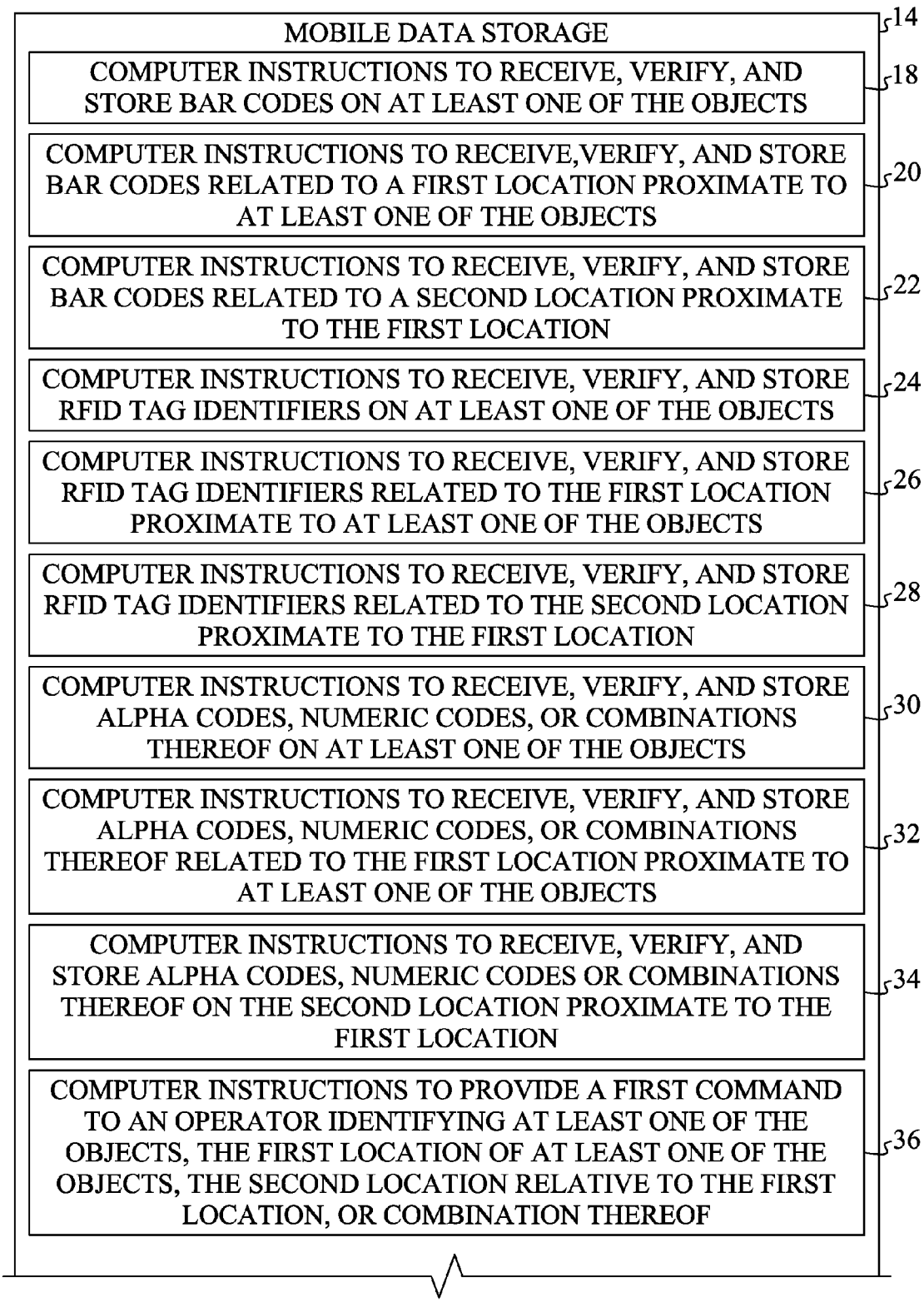
FIG. 2A shows computer instructions in the mobile data storage.

FIG. 2A depicts an embodiment of the mobile data storage 14 usable with the method.

The mobile data storage 14 is shown including: computer instructions 18 to receive, verify, and store bar codes on at least one of the objects; computer instructions 20 to receive, verify, and store bar codes related to a first location proximate to at least one of the objects; computer instructions 22 to receive, verify, and store bar codes related to a second location proximate to the first location; computer instructions 24 to receive, verify, and store RFID tag identifiers on at least one of the objects; and computer instructions 26 to receive, verify, and store an RFID tag related to the first location proximate to at least one of the objects.

The mobile data storage 14 is also shown including: computer instructions 28 to receive, verify, and store an RFID tag related to the second location proximate to the first location; computer instructions 30 to receive, verify, and store alpha codes, numeric codes, or combinations thereof on at least one of the objects; computer instructions 32 to receive, verify, and store alpha codes, numeric codes, or combinations thereof related to the first location proximate to at least one of the objects; computer instructions 34 to receive, verify, and store alpha codes, numeric codes or combinations thereof on the second location proximate to the first location; and computer instructions 36 to provide a first command to an operator identifying at least one of the objects, the first location of at least one of the objects, the second location relative to the first location, or combination thereof.

Figure 2B:
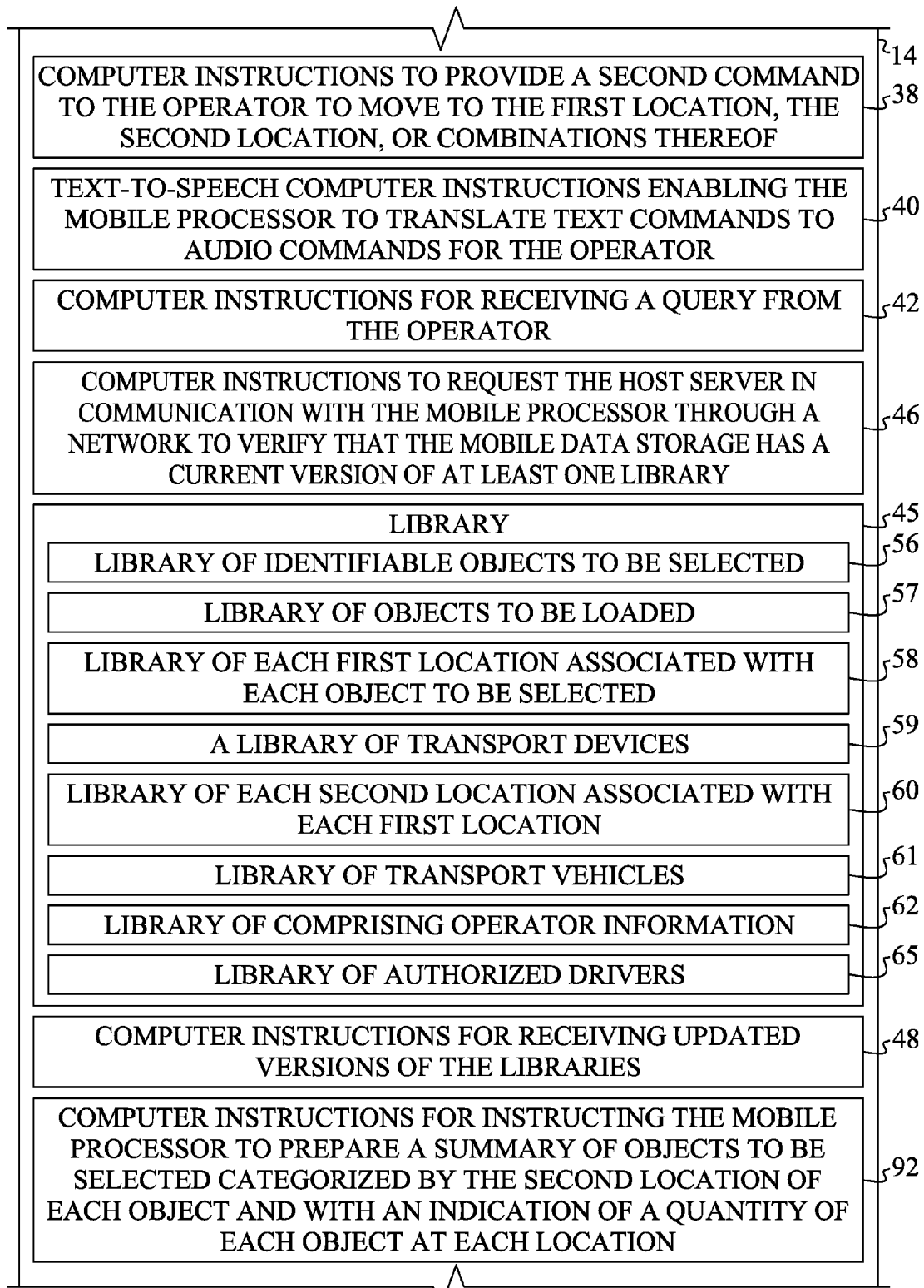
FIG. 2B is a continuation of FIG. 2A.

FIG. 2B shows a continuation of FIG. 2A.

The mobile data storage 14 can include: computer instructions 38 to provide a second command to the operator to move to the first location, the second location, or combinations thereof; text-to-speech computer instructions 40 enabling the mobile processor to translate text commands to audio commands for the operator; computer instructions 42 for receiving a query from the operator; and computer instructions 46 to request the host server in communication with the mobile processor through a network to verify that the mobile data storage has a current version of at least one library.

The mobile data storage 14 can include the libraries 45 which can include: the library of identifiable objects to be selected 56; the library of each first location associated with each object to be selected 58; the library of each second location associated with each first location 60; the library of comprising operator information 62, which can be a list of operators who are authorized to use the host data storage.

The library 45 can also include the library of objects to be loaded 57; the library of transport devices 59; the library of authorized drivers 65; and the library of transport vehicles 61.

The mobile data storage 14 can include computer instructions for receiving updated versions of the libraries 48 and computer instructions for instructing the mobile processor to prepare a summary of objects to be selected and categorized by the second location of each object and with an indication of a quantity of each object at each location 92.

Figure 2C:
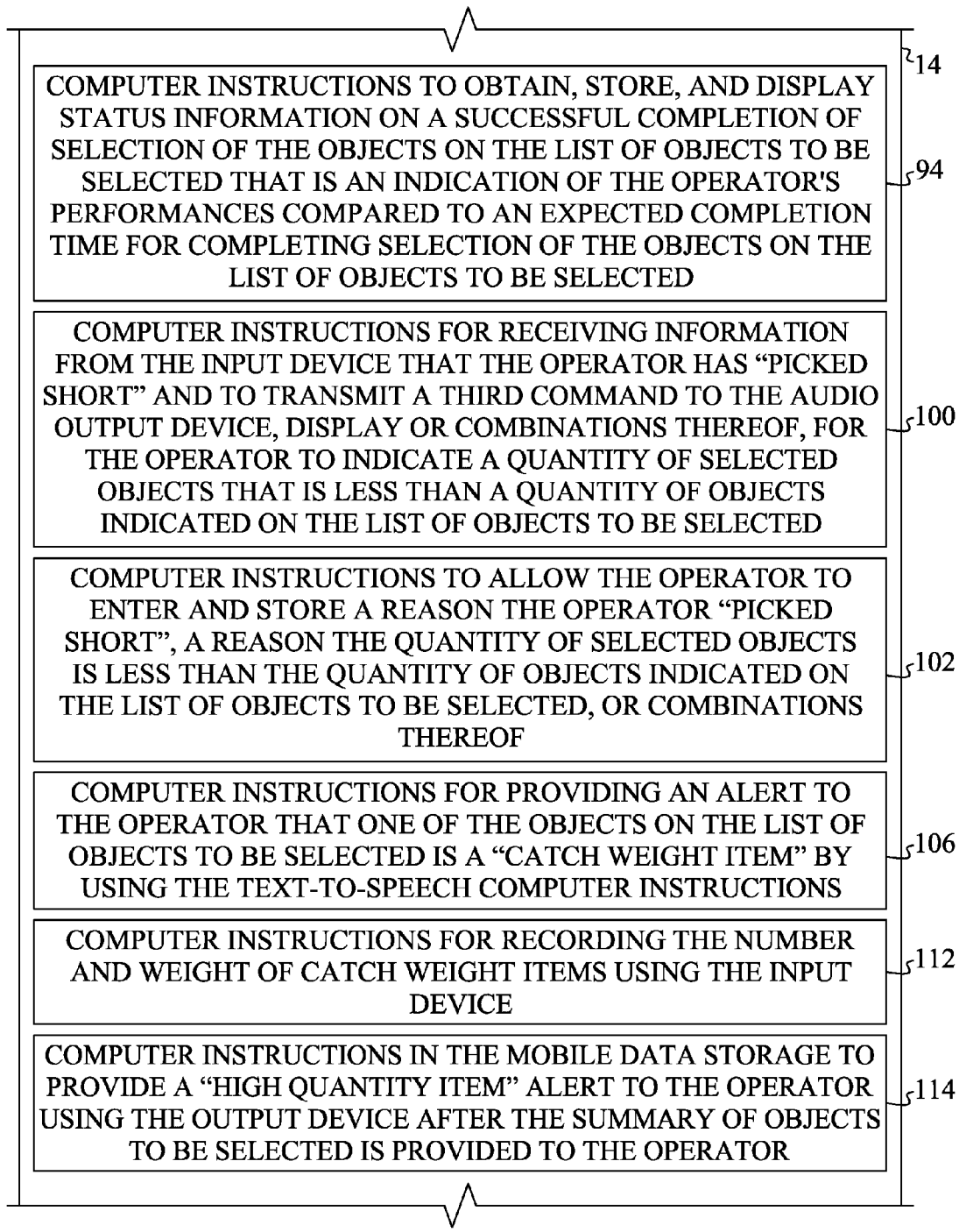
FIG. 2C is a continuation of FIG. 2B.

FIG. 2C is a continuation of FIG. 2B.

The mobile data storage 14 can include: computer instructions 94 to obtain, store, and display status information on a successful completion of selection of the objects on the list of objects to be selected that is an indication of the operator's performances compared to an expected completion time for completing selection of the objects on the list of objects to be selected and computer instructions 100 for receiving information from the input device that the operator has "picked short" and to transmit a third command to the audio output device, display or combinations thereof, for the operator to indicate a quantity of selected objects that is less than a quantity of objects indicated on the list of objects to be selected.

The mobile data storage 14 can include: computer instructions 102 to allow the operator to enter and store a reason the operator "picked short", a reason the quantity of selected objects is less than the quantity of objects indicated on the list of objects to be selected, or combinations thereof; computer instructions 106 for providing an alert to the operator that one of the objects on the list of objects to be selected is a "catch weight item" by using the text-to-speech computer instructions; computer instructions 112 for recording the number and weight of catch weight items using the input device; and computer instructions 114 to provide a "high quantity item" alert to the operator using the output device after the summary of objects to be selected is provided to the operator.

Figure 2D:
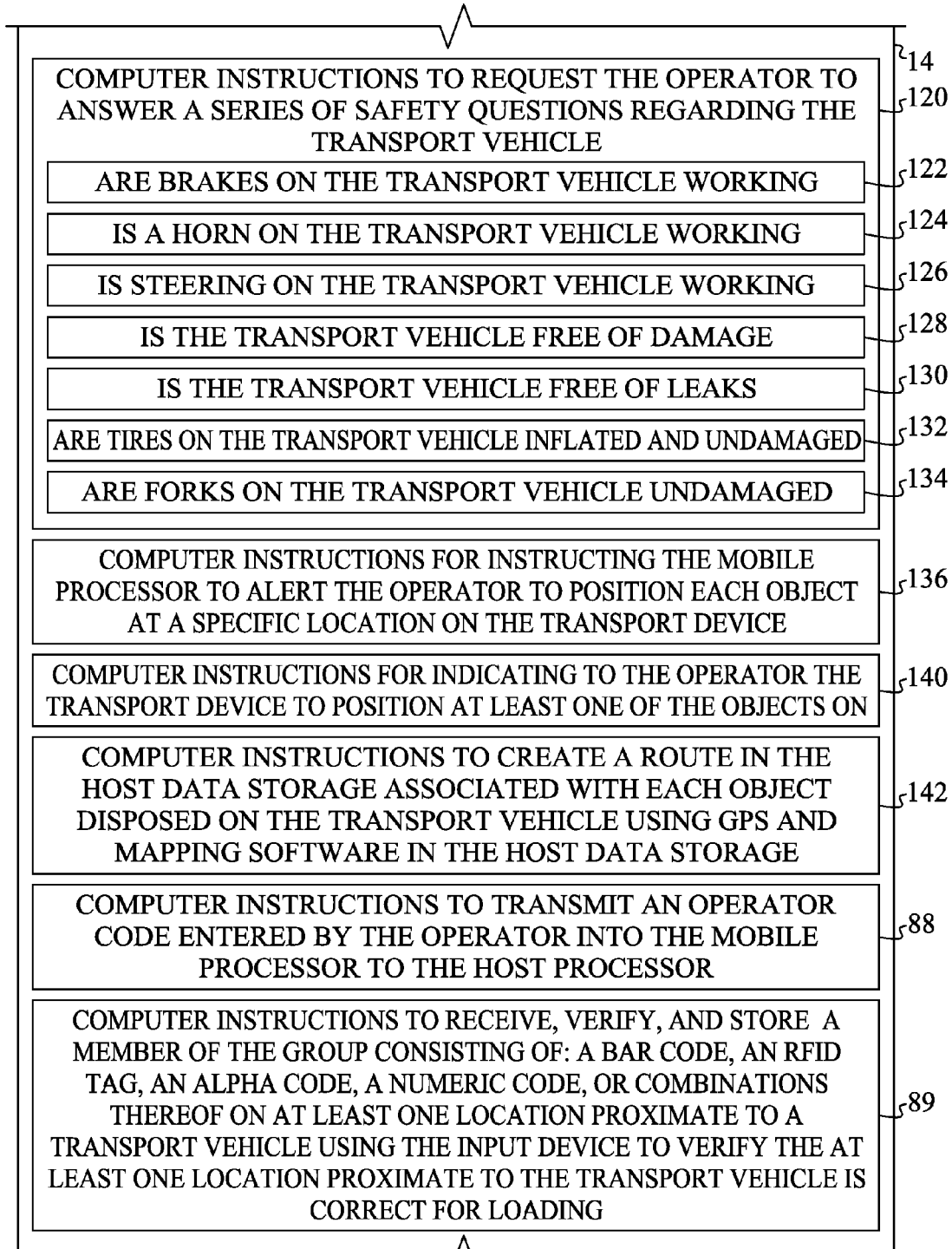
FIG. 2D is a continuation of FIG. 2C.

FIG. 2D is a continuation of FIG. 2C.

The mobile data storage 14 can include: computer instructions 120 to request the operator to answer a series of safety questions regarding the transport vehicle; computer instructions 136 for instructing the mobile processor to alert the operator to position each object at a specific location on the transport device; computer instructions 140 in the mobile data storage for indicating to the operator the transport device to position at least one of the objects on; and computer instructions 142 to create a route in the host data storage associated with each object disposed on the transport vehicle using GPS and mapping software in the host data storage.

The computer instructions 120 is shown including the following questions: are brakes on the transport vehicle working? 122; is a horn on the transport vehicle working? 124; is steering on the transport vehicle working? 126; is the transport vehicle free of damage? 128; is the transport vehicle free of leaks? 130; are tires on the transport vehicle inflated and undamaged? 132; and are forks on the transport vehicle undamaged? 134.

Where the questions are designed to normally be answered "yes" the operator with this system can reply "yes" by clicking twice with the OLI trigger.

Also shown in the mobile data storage 14 is computer instructions 88 to transmit an operator code entered by the operator into the mobile processor to the host processor.

The mobile data storage 14 can have computer instructions 89 to receive, verify, and store a member of the group consisting of: a bar code, an RFID tag, an alpha code, a numeric code, or combinations thereof on at least one location proximate to a transport vehicle using the input device to verify the at least one location proximate to the transport vehicle is correct for loading.

Figure 2E:
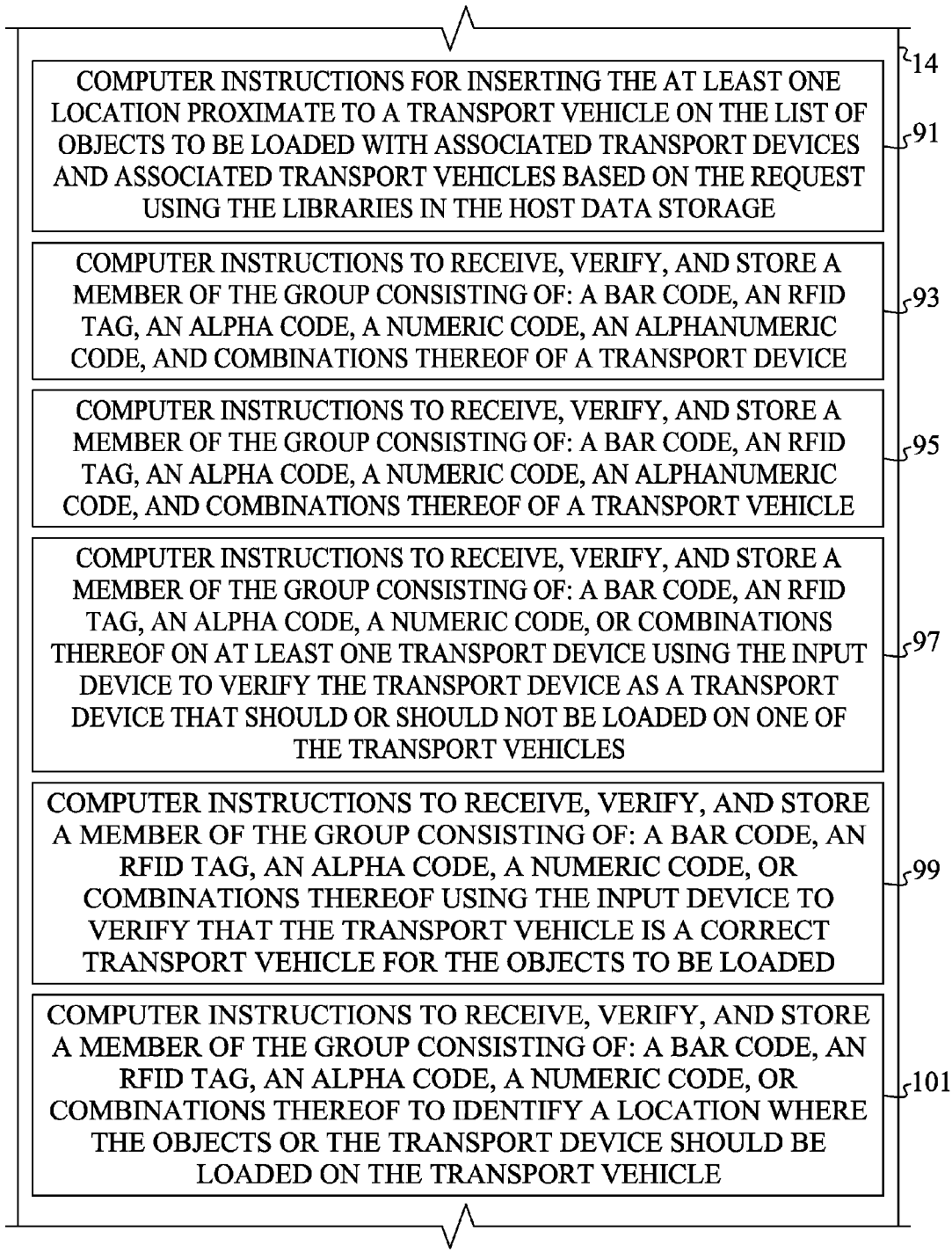
FIG. 2E is a continuation of FIG. 2D.

FIG. 2E is a continuation of FIG. 2D.

The mobile data storage 14 can include computer instructions 91 for inserting the at least one location proximate to a transport vehicle on the list of objects to be loaded with associated transport devices and associated transport vehicles based on the request using the libraries in the host data storage.

The mobile data storage 14 can include: computer instructions 93 to receive, verify, and store a member of the group consisting of: a bar code, an RFID tag, an alpha code, a numeric code, an alphanumeric code, and combinations thereof of a transport device; computer instructions 95 to receive, verify, and store a member of the group consisting of: a bar code, an RFID tag, an alpha code, a numeric code, an alphanumeric code, and combinations thereof of a transport vehicle; computer instructions 97 to receive, verify, and store a member of the group consisting of: a bar code, an RFID tag, an alpha code, a numeric code, or combinations thereof on at least one transport device using the input device to verify the transport device as a transport device that should or should not be loaded on one of the transport vehicles; computer instructions 99 to receive, verify, and store a member of the group consisting of: a bar code, an RFID tag, an alpha code, a numeric code, or combinations thereof using the input device to verify that the transport vehicle is a correct transport vehicle for the objects to be loaded; and computer instructions 101 to receive, verify, and store a member of the group consisting of: a bar code, an RFID tag, an alpha code, a numeric code, or combinations thereof to identify a location where the objects or the transport device should be loaded on the transport vehicle.

Figure 2F:
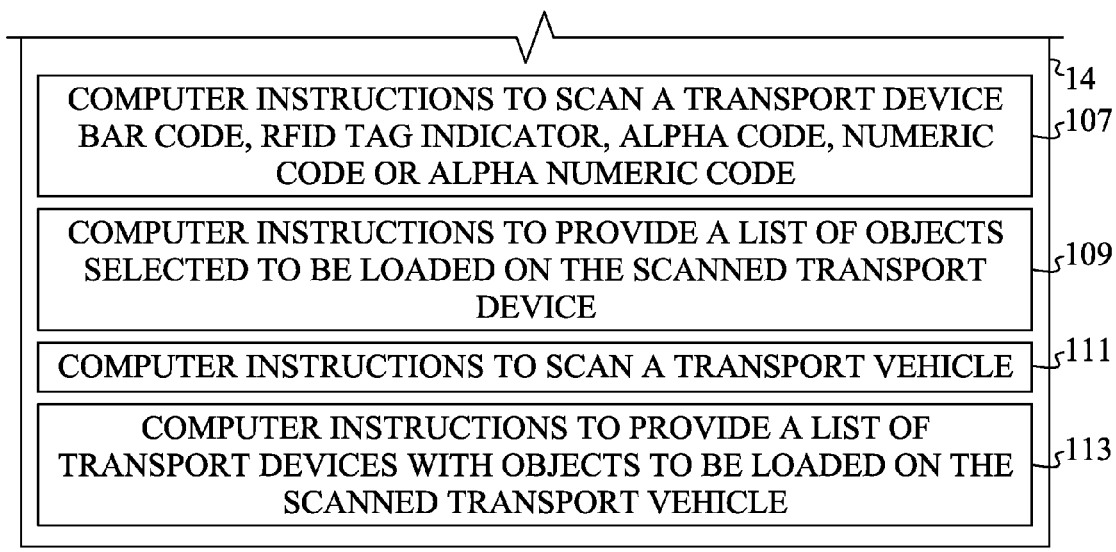
FIG. 2F is a continuation of FIG. 2E.

FIG. 2F is a continuation of FIG. 2E.

The mobile data storage 14 can include: computer instructions 107 to scan a transport device bar code, RFID tag indicator, alpha code, numeric code or alpha numeric code; computer instructions 109 to provide a list of objects selected to be loaded on the scanned transport device; computer instructions 111 to scan a transport vehicle; and computer instructions 113 to provide a list of transport devices with objects to be loaded on the scanned transport vehicle.

Figure 3A:
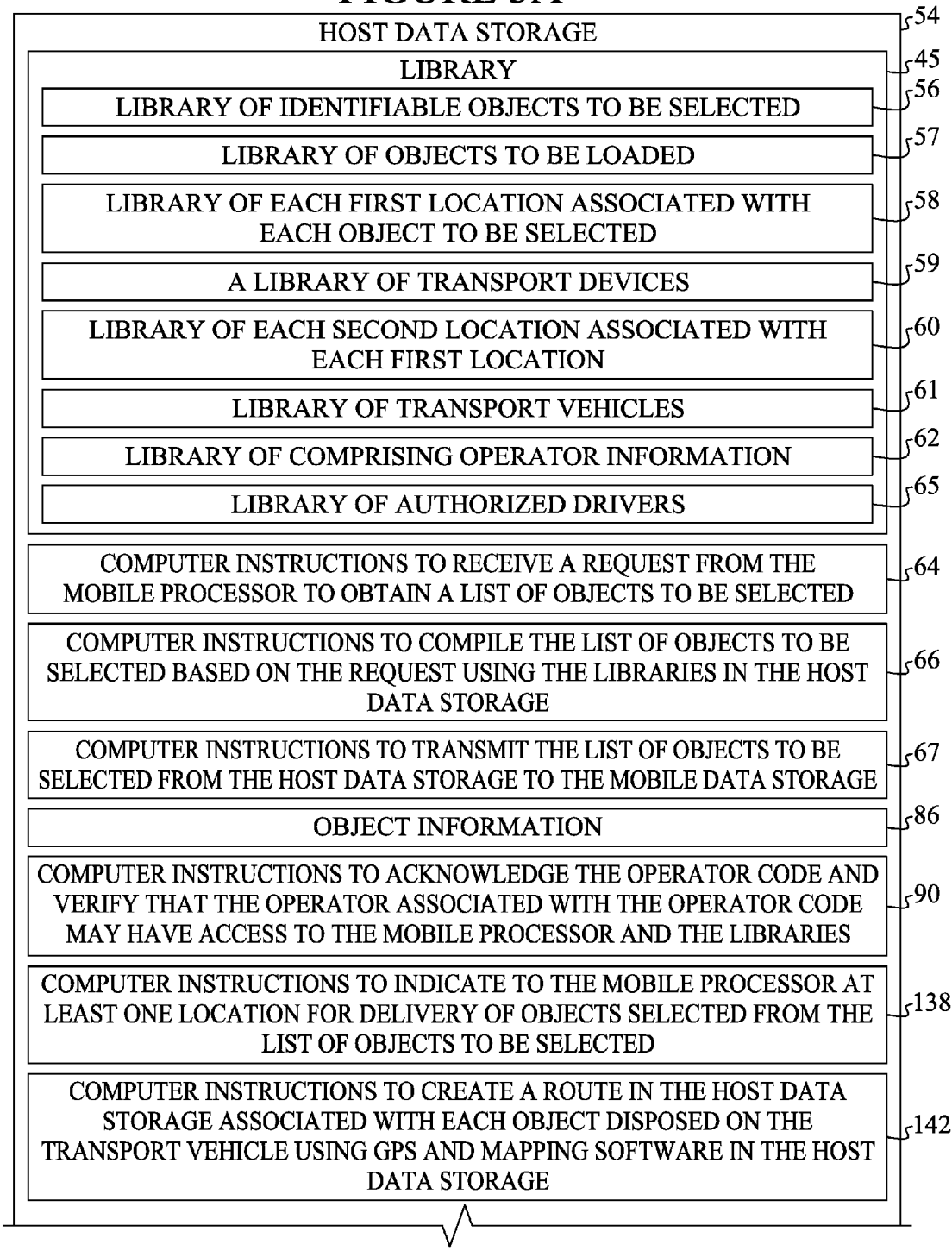
FIG. 3A shows an embodiment of the host data storage with computer instructions.

FIG. 3A shows an embodiment of a host data storage 54 including the library 45 usable with the method.

The library 45 can include: the library of identifiable objects to be selected 56; the library of each first location associated with each object to be selected 58; the library of each second location associated with each first location 60; the library of operator information 62; the library of objects to be loaded 57; the library of transport devices 59; the library of authorized drivers 65; and the library of transport vehicles 61.

The host data storage 54 can include: computer instructions 64 to receive a request from the mobile processor to obtain a list of objects to be selected; computer instructions 66 to compile the list of objects to be selected based on the request using the libraries in the host data storage; computer instructions 67 to transmit the list of objects to be selected from the host data storage to the mobile data storage; object information 86; computer instructions 90 to acknowledge the operator code and verify that the operator associated with the operator code may have access to the mobile processor and the libraries; computer instructions 142 to create a route in the host data storage associated with each object disposed on the transport vehicle using GPS and mapping software in the host data storage; and computer instructions 138 to indicate to the mobile processor at least one location for delivery of objects selected from the list of objects to be selected.

Figure 3B:
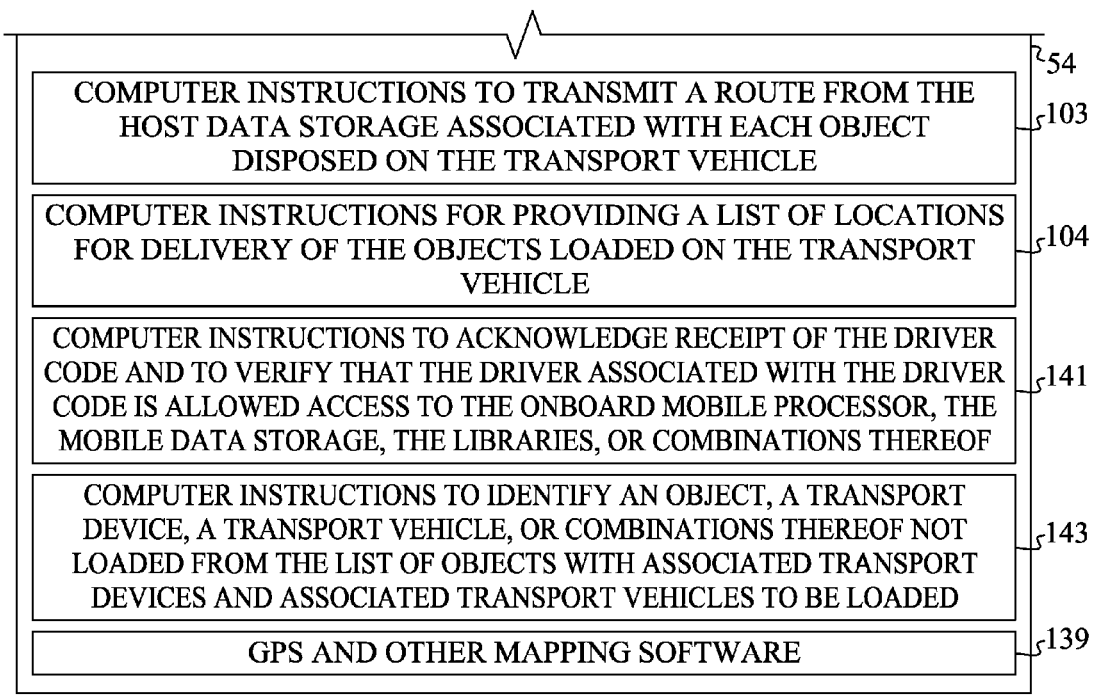
FIG. 3B is a continuation of FIG. 3A.

FIG. 3B is a continuation of FIG. 3A.

The host data storage 54 can include GPS and other mapping software 139.

The host data storage 54 can include computer instructions 141 to acknowledge receipt of the driver code and to verify that the driver associated with the driver code is allowed access to the onboard mobile processor, the mobile data storage, the libraries, or combinations thereof and computer instructions 143 to identify an object, a transport device, a transport vehicle, or combinations thereof not loaded from the list of objects with associated transport devices and associated transport vehicles to be loaded.

The host data storage 54 can include computer instructions 103 to transmit a route from the host data storage associated with each object disposed on the transport vehicle and computer instructions 104 for providing a list of locations for delivery of the objects loaded on the transport vehicle.

FIG. 4 depicts an OLI trigger 74 sending a double click signal 76, a single click signal 78, and a hold signal 80 to the mobile processor 12.

The mobile processor 12 can be in communication with the host server 51 which can in-turn be in communication with an external computer system 55 through the network 50.

A mobile printer 73 can be in communication with the mobile processor 12 for printing reports and lists or other data.

FIG. 5 shows a transport vehicle 118 with a GPS device 144 and a transport onboard processor 150 with an onboard mobile data storage 152 and a transport vehicle display 153.

The transport onboard processor 150 can be in communication with the mobile processor 12 through the network 50.

An operator 17 is shown with an OLI trigger 74 sending a "double click" signal 76 to the mobile processor 12.

Transport device 116 is shown with objects 8*a*, 8*d*, and 8*f* disposed thereon.

Computer instructions 154 are shown in the onboard mobile data storage to receive the route from the host server.

Computer instructions 156 are also shown in the onboard mobile data storage to enable locations associated with each object positioned on the transport device to be identified and placed into the route for delivery on the transport vehicle display.

Figure 6:
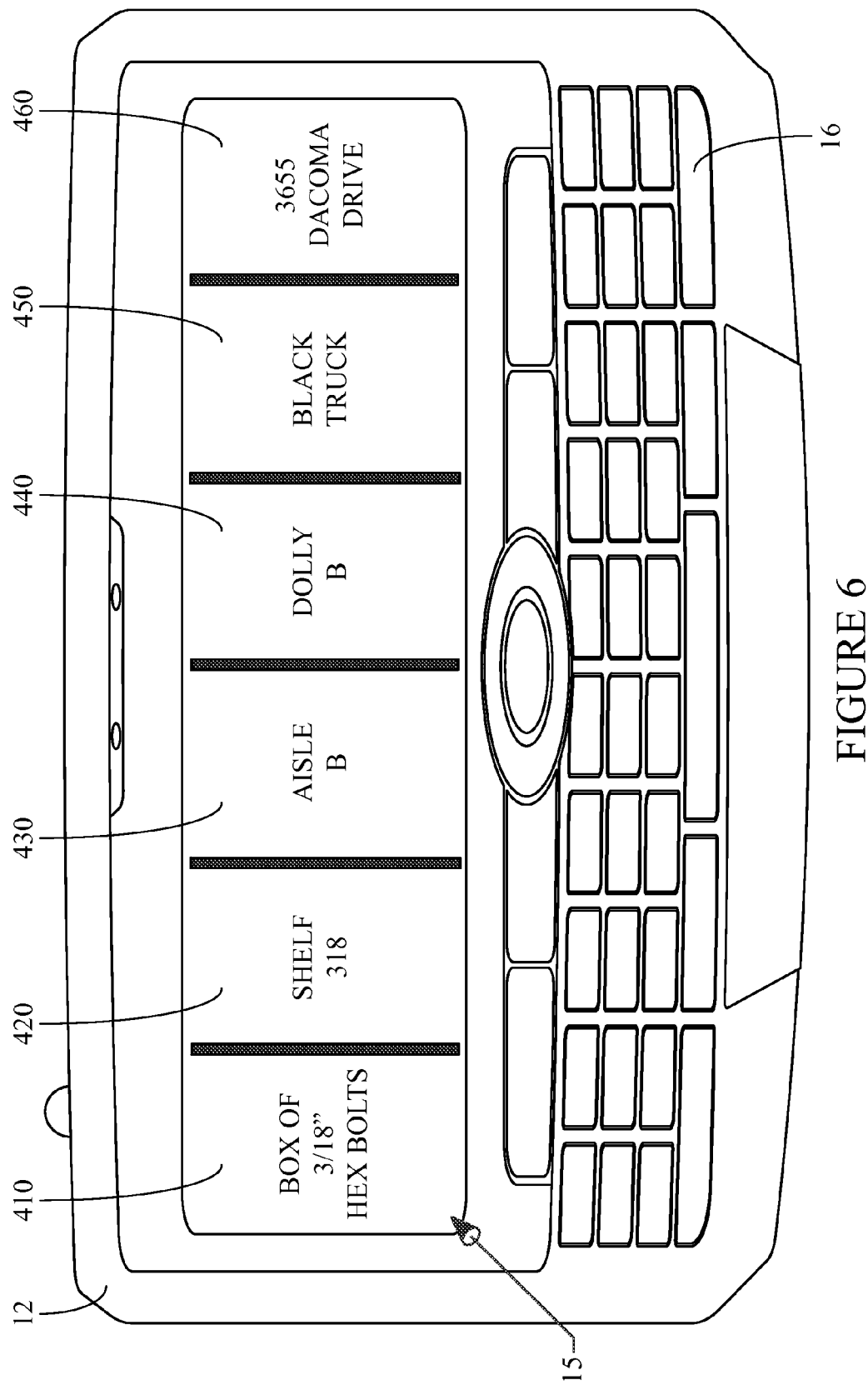
FIG. 6 shows an embodiment of commands on the display of the mobile processor.

FIG. 6 depicts an embodiment of the mobile processor 12 with the input device 16 and the display 15.

The display 15 can present various instructions and information related to an object to be selected, loaded, transported, and delivered.

In the example depicted, which is for illustrative purposes only, the object is a box of 3/18" hex bolts as shown by command 410. The location of the object is Shelf 318 on Aisle B as illustrated by commands 420 and 430. The object is to be loaded onto Dolly B and then on the Black Truck as is illustrated by commands 440 and 450. The object is then to be delivered to 3655 Dacoma Drive as is illustrated by command 460.

Figure 7:
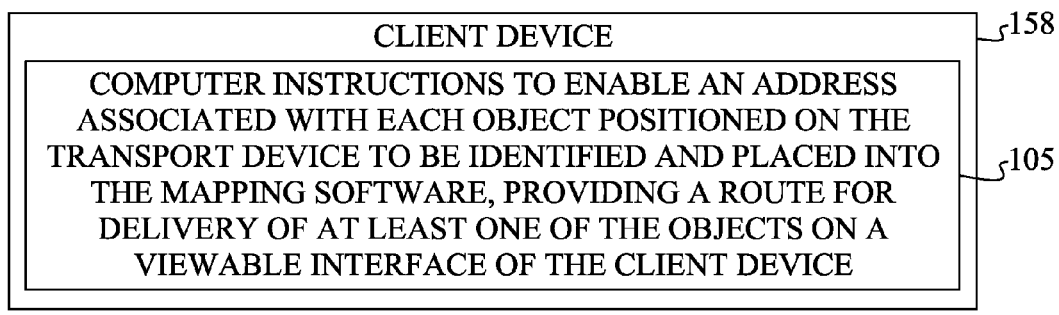
FIG. 7 shows an embodiment of a client device.

FIG. 7 depicts an embodiment of the client device 158 with computer instructions 105 to enable an address associated with each object positioned on the transport device to be identified and placed into the mapping software, providing a route for delivery of at least one of the objects on a viewable interface of the client device.

While these embodiments have been described with emphasis on the embodiments, it should be understood that within the scope of the appended claims, the embodiments might be practiced other than as specifically described herein.

What is claimed is:

1. A computer implemented method for loading objects onto at least one transport vehicle, wherein the method comprises:
   a. using at least one mobile processor for use by an operator in communication with a host server, an input device, and two output devices to receive commands and provide responses;
   b. using computer instructions in the mobile data storage to:
      (i) receive, verify, and store a member of the group consisting of: a bar code, an RFID tag, an alpha code, a numeric code, an alphanumeric code, and combinations thereof on at least one object;
      (ii) receive, verify, and store a member of the group consisting of: a bar code, an RFID tag, an alpha code, a numeric code, an alphanumeric code, and combinations thereof of a first location proximate to the at least one object;
      (iii) receive, verify, and store a member of the group consisting of: a bar code, an RFID tag, an alpha code, a numeric code, an alphanumeric code, and combinations thereof of a second location proximate to the first location;
      (iv) receive, verify, and store a member of the group consisting of: a bar code, an RFID tag, an alpha code, a numeric code, an alphanumeric code, and combinations thereof of a transport device;
      (v) receive, verify, and store a member of the group consisting of: a bar code, an RFID tag, an alpha code, a numeric code, an alphanumeric code, and combinations thereof of a transport vehicle;
      (vi) scan or read a member of the group consisting of: a bar code, an RFID tag, an alpha code, a numeric code, an alphanumeric code, and combinations thereof of a transport vehicle
      (vii) receive, verify, and store a member of the group consisting of: a bar code, an RFID tag, an alpha code, a numeric code, or combinations thereof on at least one transport device using the input device to verify the transport device as a transport device that should or should not be loaded on one of the transport vehicles;
      (viii) receive, verify, and store a member of the group consisting of: a bar code, an RFID tag, an alpha code, a numeric code, or combinations thereof using the input device to verify that the transport vehicle is a correct transport vehicle for the objects to be loaded;
      (ix) receive, verify, and store a member of the group consisting of: a bar code, an RFID tag, an alpha code, a numeric code, or combinations thereof to identify a location where the objects or the transport device should be loaded on the transport vehicle;
      (x) provide a command to an operator identifying the at least one object, the first location of the at least one object, the second location relative to the first location, the transport device, the transport vehicle, or combinations thereof;
      (xi) provide a command to the operator to move to the at least one object, the first location, the second location, the transport device, the transport vehicle, or combinations thereof;
      (xii) enable the mobile processor to translate a text command to an audio command for the operator;
      (xiii) receive a query from the operator;
      (xiv) provide a result to the two output devices;
      (xv) request a host processor in communication with the mobile processor through a network to verify that the mobile data storage has a current version of at least one library selected from the group of libraries comprising:
         1. a library of objects to be loaded, wherein the library of objects comprises a location for each object;
         2. a library of transport devices associated with each object to be loaded, wherein the library of transport devices comprises a location for each transport device;
         3. a library of transport vehicles, wherein the library of transport vehicles comprises a location for each transport vehicle;
         4. a library of operator information; or
         5. combinations thereof; and
      (xvi) receive updated versions of the libraries from the host data storage;
   c. using computer instructions to instruct the host processor to provide the mobile processor with the at least one library and a list of objects to be loaded, a list of transport devices to be loaded, and a list of transport vehicles to be loaded prior to issuing the commands, wherein the host processor is in communication with a host data storage, and wherein the host data storage comprises:

(i) the library of objects to be loaded;
(ii) the library of transport devices associated with each object to be loaded;
(iii) the library of transport vehicles;
(iv) the library of operator information;
(v) computer instructions to receive a request from the mobile processor to obtain the list of objects to be loaded;
(vi) computer instructions to compile the list of objects to be loaded with associated transport devices and associated transport vehicles based on the request using the libraries in the host data storage; and
(vii) computer instructions to transmit the list of objects to be loaded with associated transport devices and associated transport vehicles from the host data storage to the mobile data storage;

d. using the two output devices in communication with the mobile processor to:
(i) provide at least one of the commands through an audio output device for the operator to hear; and
(ii) provide a visual display presenting the list of objects to be loaded with associated transport devices and associated transport vehicles to the operator, or presenting at least one of the commands to the operator visually, or combinations thereof; and e. using an object location identification trigger in communication with the mobile processor by:
(i) pressing at least a portion of the object location identification trigger and holding in a pressed state to provide a "hold" signal to the mobile processor as a response to respond to at least one of the commands that informs the mobile processor that the operator will perform at least one of the following:
1. scan or read a member of the group consisting of: a bar code, an RFID tag, an alpha code, a numeric code, an alphanumeric code, and combinations thereof on at least one object, and then loading the object;
2. scan or read a member of the group consisting of: a bar code, an RFID tag, an alpha code, a numeric code, an alphanumeric code, and combinations thereof of a first location proximate to the at least one object prior to loading the object;
3. scan or read a member of the group consisting of: a bar code, an RFID tag, an alpha code, a numeric code, an alphanumeric code, and combinations thereof of a second location proximate to the first location prior to loading the object;
4. scan or read a member of the group consisting of: a bar code, an RFID tag, an alpha code, a numeric code, an alphanumeric code, and combinations thereof of a transport device onto which the object is to be loaded;
5. scan or read a member of the group consisting of: a bar code, an RFID tag, an alpha code, a numeric code, an alphanumeric code, and combinations thereof of a transport vehicle onto which the transport device is to be loaded; or
6. combinations thereof;
(ii) pressing at least the portion of the object location identification trigger twice to provide a double-click signal to the mobile processor as a response to at least one of the commands that informs the mobile processor that the operator has completed the at least one command, that the operator has arrived at the first location, that the operator has arrived at the second location, that the operator is at the transport device, that the operator is at the transport vehicle that the operator is ready to accept a new command, that the operator is ready to proceed to a next step, or combinations thereof;
(iii) pressing at least the portion of the object location identification trigger once to provide a single-click signal to the mobile processor as a response to respond to at least one of the commands that informs the mobile processor to repeat the most recent command, question, information or statement; or
(iv) combinations thereof; and f. repeating steps a-e until all objects on the list of objects to be loaded are in fact loaded.

2. The method of claim 1, further comprising computer instructions to receive, verify, and store a member of the group consisting of: a bar code, an RFID tag, an alpha code, a numeric code, or combinations thereof on at least one location proximate to a transport vehicle using the input device to verify the at least one location proximate to the transport vehicle is correct for loading.

3. The method of claim 2, further comprising computer instructions for inserting the at least one location proximate to a transport vehicle on the list of objects to be loaded with associated transport devices and associated transport vehicles based on the request using the libraries in the host data storage.

4. The method of claim 1, further comprising transferring the at least one command, the list of objects to be loaded with associated transport devices and associated transport vehicles, the at least one library, or combinations thereof between the mobile processor, the host processor, and at least one external computer system.

5. The method of claim 4, wherein the at least one external computer system functions the same as the mobile processor.

6. The method of claim 1, further comprising an additional input device to use along with the Object Location Identification trigger, wherein the additional input device is a keyboard, a touch screen, or combinations thereof.

7. The method of claim 1, further comprising using a 3-dimensional spatial coordinate sensor as the input device to allow the operator to use a physical motion to communicate to the mobile processor at least one of the following:
a. a dimension of the at least one object;
b. a 3-dimensional spatial coordinate of the at least one object;
c. a yes command;
d. a no command;
e. a repeat command;
f. a completed task command;
g. a "cannot find transport vehicle, transport device, or combinations thereof" command;
h. an alpha code;
i. a numeric code; or
j. combinations thereof.

8. The method of claim 1, further comprising entering an operator code for logging onto the mobile processor, wherein the operator code is transmitted to the host processor via computer instructions within the mobile data storage, and wherein the host data storage has computer instructions to acknowledge receipt of the operator code and to verify that the operator associated with the operator code is allowed access to the mobile processor, the mobile data storage, the libraries, or combinations thereof.

9. The method of claim 1, further comprising using a button on a wearable scanner, an optical reader, an RFID reader, a trigger on a scanner, an optical reader, an actuator on a scanner, a reader, an input device, or combinations thereof as the object or location identification trigger.

10. The method of claim 1 further comprising using computer instructions in the mobile data storage for instructing the mobile processor to prepare a summary of objects to be loaded, a summary of transport devices to be loaded, a summary of transport vehicles to be loaded, an indication of a quantity of objects at each location, or combinations thereof.

11. The method of claim 1, further comprising using computer instructions in the mobile data storage to obtain status information on the loading of objects, wherein the status information is an indication of the operator's performance compared to an expected completion time for loading the list of objects.

12. The method of claim 11, further comprising using computer instructions to identify an object, a transport device, a transport vehicle, or combinations thereof not loaded from the list of objects with associated transport devices and associated transport vehicles to be loaded.

13. The method of claim 1, further comprising using computer instructions in the mobile data storage to request the operator to answer a series of safety questions regarding one of the transport vehicles that includes at least one question selected from the group comprising:
   a. are the brakes of the transport vehicle working?;
   b. is the horn of the transport vehicle working?;
   c. is the steering of the transport vehicle working?;
   d. is there any damage to the transport vehicle?;
   e. is there a leak within the transport vehicle?;
   f. are the tires on the transport vehicle inflated and undamaged?;
   g. are forks on the transport vehicle undamaged?; or
   h. combinations thereof.

14. The method of claim 1, further comprising using computer instructions in the mobile data storage for instructing the mobile processor to alert the operator to position each object at a specific location on one of the transport device, one of the transport vehicles, or combinations thereof.

15. A computer implemented method for loading and delivering objects using at least one transport vehicle, wherein the method comprises:
   a. using at least one mobile processor for use by an operator, wherein the at least one mobile processor is in communication with a host server, an input device, and two output devices to receive commands and provide responses;
   b. using at least one onboard mobile processor for use by a driver, wherein the at least one onboard mobile processor is in communication with the host server, the input device, and the two output devices to receive commands and provide responses;
   c. using computer instruction in each mobile data storage to:
      (i) receive, verify, and store a member of the group consisting of: a bar code, an RFID tag, an alpha code, a numeric code, an alphanumeric code, and combinations thereof on at least one object;
      (ii) receive, verify, and store a member of the group consisting of: a bar code, an RFID tag, an alpha code, a numeric code, an alphanumeric code, and combinations thereof of a first location proximate to the at least one object;
      (iii) receive, verify, and store a member of the group consisting of: a bar code, an RFID tag, an alpha code, a numeric code, an alphanumeric code, and combinations thereof of a second location proximate to the first location;
      (iv) receive, verify, and store a member of the group consisting of: a bar code, an RFID tag, an alpha code, a numeric code, an alphanumeric code, and combinations thereof of a transport device;
      (v) receive, verify, and store a member of the group consisting of: a bar code, an RFID tag, an alpha code, a numeric code, an alphanumeric code, and combinations thereof of a transport vehicle;
      (vi) receive, verify, and store a member of the group consisting of: a bar code, an RFID tag, an alpha code, a numeric code, or combinations thereof on at least one transport device using the input device to verify the transport device as a transport device that should or should not be loaded on one of the transport vehicles;
      (vii) receive, verify, and store a member of the group consisting of: a bar code, an RFID tag, an alpha code, a numeric code, or combinations thereof using the input device to verify that the transport vehicle is a correct transport vehicle for the objects to be loaded;
      (viii) receive, verify, and store a member of the group consisting of: a bar code, an RFID tag, an alpha code, a numeric code, or combinations thereof to identify a location where the objects or the transport device should be loaded on the transport vehicle;
      (ix) receive, verify, and store a member of the group consisting of: a bar code, an RFID tag, an alpha code, a numeric code, or combinations thereof for a delivery location using the input device to verify the transport vehicle is at the delivery location and that the object has been delivered;
      (x) provide a command to an operator identifying the at least one object, the first location of the at least one object, the second location relative to the first location, the transport device, the transport vehicle, the delivery location, or combinations thereof;
      (xi) provide a command to the operator to move to the at least one object, the first location, the second location, the transport device, the transport vehicle, the delivery location, or combinations thereof;
      (xii) enable the mobile processor to translate a text command to an audio command for the operator;
      (xiii) receive a query from the operator;
      (xiv) provide a result to the two output devices;
      (xv) request a host processor in communication with the mobile processor through a network to verify that the mobile data storage has a current version of at least one library selected from the group of libraries comprising:
         1. a library of objects to be loaded, wherein the library of objects comprises a location for each object;
         2. a library of transport devices associated with each object to be loaded, wherein the library of transport devices comprises a location for each transport device;
         3. a library of transport vehicles, wherein the library of transport vehicles comprises a location for each transport vehicle;
         4. a library of delivery locations, wherein the library of delivery locations comprises an address, a longitude and a latitude, or another geographical indicator;
         5. a library of operator information; or
         6. combinations thereof; and
      (xvi) receive updated versions of the libraries from the host data storage;

d. using computer instructions to instruct the host processor to provide at least one of the mobile processors or at least one of the onboard mobile processors with the at least one library and a list of objects to be loaded, a list of transport devices to be loaded, a list of transport vehicles to be loaded, a list of delivery locations, wherein the host processor is in communication with a host data storage, and wherein the host data storage comprises:
  (i) the library of objects to be loaded;
  (ii) the library of transport devices associated with each object to be loaded;
  (iii) the library of transport vehicles;
  (iv) the library of delivery locations;
  (v) the library of operator information;
  (vi) computer instructions to receive a request from the at least one mobile processor to obtain the list of objects to be loaded;
  (vii) computer instructions to compile the list of objects to be loaded with associated transport devices and associated transport vehicles based on the request using the libraries in the host data storage;
  (viii) computer instructions to transmit the list of objects to be loaded with associated transport devices and associated transport vehicles from the host data storage to the at least one mobile data storage; and
  (ix) computer instructions to form at least one route for delivery of the list of objects, with associated transport devices, associated transport vehicles, and delivery locations;
e. using the two output devices in communication with the mobile processor to:
  (iii) provide at least one of the commands through an audio output device for the operator to hear; and
  (iv) provide a visual display presenting the list of objects to be loaded with associated transport devices and associated transport vehicles to the operator, or presenting at least one of the commands to the operator visually, or combinations thereof; and
f. using an object location identification trigger in communication with the mobile processor by:
  (i) pressing at least a portion of the object location identification trigger and holding in a pressed state to provide a "hold" signal to the mobile processor as a response to at least one of the commands that informs the mobile processor that the operator will perform at least one of the following:
    1. scan or read a member of the group consisting of: a bar code, an RFID tag, an alpha code, a numeric code, an alphanumeric code, and combinations thereof on at least one object, and then loading the object;
    2. scan or read a member of the group consisting of: a bar code, an RFID tag, an alpha code, a numeric code, an alphanumeric code, and combinations thereof of a first location proximate to the at least one object prior to loading the object;
    3. scan or read a member of the group consisting of: a bar code, an RFID tag, an alpha code, a numeric code, an alphanumeric code, and combinations thereof of a second location proximate to the first location prior to loading the object;
    4. scan or read a member of the group consisting of: a bar code, an RFID tag, an alpha code, a numeric code, an alphanumeric code, and combinations thereof of a transport device onto which the object is to be loaded;
    5. scan or read a member of the group consisting of: a bar code, an RFID tag, an alpha code, a numeric code, an alphanumeric code, and combinations thereof of a transport vehicle onto which the transport device is to be loaded; or
    6. combinations thereof;
  (ii) pressing at least the portion of the object location identification trigger twice to provide a double-click signal to the mobile processor as a response to at least one of the commands that informs the mobile processor that the operator has completed the at least one command, that the operator has arrived at the first location, that the operator has arrived at the second location, that the operator is at the transport device, that the operator is at the transport vehicle that the operator is ready to accept a new command, that the operator is ready to proceed to a next step, or combinations thereof;
  (iii) pressing at least the portion of the object location identification trigger once to provide a single-click signal to the mobile processor as a response to at least one of the commands that informs the mobile processor to repeat the most recent command, question, information or statement; or
  (iv) combinations thereof;
g. repeating steps a-f until all objects on the list of objects to be loaded are in fact loaded or delivered; and
h. using the computer instructions in the host data storage to transmit to the at least one mobile processor or the onboard mobile processor at least one route for delivery of the list of objects, with associated transport devices, associated transport vehicles, and delivery locations.

16. The method of claim 15, further comprising computer instructions to receive, verify, and store a member of the group consisting of: a bar code, an RFID tag, an alpha code, a numeric code, or combinations thereof using the input device to identify a plurality of locations for a plurality of objects or transport devices to be loaded on at least one transport vehicle.

17. The method of claim 15, wherein the delivery location can be a pick-up location.

18. The method of claim 15, wherein the at least one transport device is a cooler, a pallet, a tote, a box, a sack, a bag, a wheeled trolley, a container, or combinations thereof.

19. The method of claim 15, wherein at least one route is procured by using GPS or other mapping software, wherein the GPS or other mapping software is stored in the host data storage, wherein the route is associated with one of the objects being carried on one of the transport vehicles, and wherein the at least one route is downloaded to the driver mobile data storage using computer instructions in at least one mobile data storage.

20. The method of claim 15, wherein the driver uses the OLI trigger to verify when each object or groups of objects is delivered to each of the delivery locations.

21. The method of claim 20, wherein the onboard mobile processor and the mobile processor are one unit.

* * * * *